United States Patent
Pack et al.

(10) Patent No.: US 6,366,241 B2
(45) Date of Patent: Apr. 2, 2002

(54) ENHANCED DETERMINATION OF POSITION-DEPENDENT SIGNAL CHARACTERISTICS OF A WIRELESS TRANSMITTER

(75) Inventors: Kenneth D. Pack, Fairfax; John E. Maloney, Springfield, both of VA (US)

(73) Assignee: TruePosition, Inc., King of Prussia, PA (US)

( * ) Notice: Subject to any disclaimer, the term of this patent is extended or adjusted under 35 U.S.C. 154(b) by 0 days.

(21) Appl. No.: 09/815,408

(22) Filed: Mar. 22, 2001

Related U.S. Application Data (60) Provisional application No. 60/214,013, filed on Jun. 26, 2000.

(51) Int. Cl.[7] ............................................. G01S 5/04
(52) U.S. Cl. ........................................ 342/442; 342/457
(58) Field of Search ................................. 342/442, 444, 342/445, 450, 457

(56) References Cited

U.S. PATENT DOCUMENTS

| | | | |
|---|---|---|---|
| 4,728,959 A | 3/1988 | Maloney et al. | 342/457 |
| 5,237,333 A * | 8/1993 | Guard | 342/424 |
| 5,745,078 A * | 4/1998 | Baghdady | 342/446 |
| 5,959,580 A | 9/1999 | Maloney et al. | 342/457 |
| 6,047,192 A | 4/2000 | Maloney et al. | 455/456 |
| 6,101,178 A | 8/2000 | Beal | 370/336 |
| 6,108,555 A | 8/2000 | Maloney et al. | 455/456 |
| 6,119,013 A | 9/2000 | Maloney et al. | 455/456 |
| 6,127,975 A | 10/2000 | Maloney | 342/457 |
| 6,195,043 B1 * | 2/2001 | Azzarelli et al. | 342/362 |

* cited by examiner

*Primary Examiner*—Dao Phan
(74) *Attorney, Agent, or Firm*—Woodcock Washburn LLP

(57) ABSTRACT

A method and system for determining with enhanced accuracy a line of bearing and related signal characteristics of a mobile wireless transceiver in a cellular-telephone communications system is presented. Three or more conventionally configured antenna elements are used to provide a high resolution line of bearing estimate through disambiguation of positional parameters associated with inter-element signal characteristics derived from signal products. The high resolution line of bearing estimate can then be used to determine the location of the transmitter.

27 Claims, 5 Drawing Sheets

FIG. 1

PLANE WAVE ARRIVING AT TWO ANTENNA ELEMENTS
SEPARATED BY A DISTANCE "d"

FIG. 3

PLANE WAVE ARRIVING AT THREE ANTENNA ELEMENTS

BLOCK DIAGRAM SHOWING DISAMBIGUATED CHARACTERIZATION AND ANGLE OF ARRIVAL EXTRACTION USING EQUIVALENT ANALYTIC SIGNALS

US 6,366,241 B2

ENHANCED DETERMINATION OF POSITION-DEPENDENT SIGNAL CHARACTERISTICS OF A WIRELESS TRANSMITTER

This application claims benefit of provisional application No. 60/214,013 filed Jun. 26, 2000.

BACKGROUND OF THE INVENTION

The present invention relates to a method and system for determining with enhanced accuracy the direction or other location-related signal characteristics of a mobile radio transmitter, such as a cellular telephone, a personal digital assistant, a two-way pager, or other wireless communications device. Location-related services, such as 911 emergency system services, require timely and accurate information. One method for locating a mobile transmitter is to determine the transmitter's directional bearings relative to two or more known locations, and to estimate the transmitter's location based on where the lines of bearing intersect. Prior directional location approaches have been thwarted by the multifold directional ambiguities that are attendant to the use of standard communications antennas in the signal measurements process, and hence have employed augmentations to the conventional antennas. The present invention enables the straightforward usage of the conventional antenna configurations in extracting the location-related signal characteristics to support accurate location determination.

SUMMARY OF THE INVENTION

The present invention provides a system, apparatus, and method for measuring position-dependent characteristics of mobile radio signals from a mobile transmitter, including: receiving the transmitted signals at an antenna configuration having multiple phase-synchronized receiving elements, performing disambiguation processing for the extraction of position-dependent characteristics of the signals, and evaluating the characteristic parameters indicative of the transmitter's position. The antenna configuration of the present invention may have three or more elements. These antenna elements may comprise at least one pair of elements whose inter-element separation is a large quantity of half wavelengths of the signals, and/or may comprise at least two pairs of elements whose inter-element separations differ by a small quantity of half wavelengths of the signals. The disambiguation processing may include the extraction of signal characteristics having reduced ambiguity for resolving the selection of the accurate positional interpretation of extracted ambiguous characteristics. Further, the disambiguation processing may include formation of differences of inter-element signal phase differences or of higher-order signal products. The evaluated characteristic parameters indicative of the transmitter's position may include angle of arrival and/or may directly quantify the transmitter's position.

In addressing the location-determination ambiguities mentioned above, a significant objective of the present invention is the innovative application of antenna configurations with elements structured and exploited to mitigate or avoid the highly ambiguous positional relations that can occur when standard communications antennas are used to sense signal characteristics indicative of transmitter positions. With such ambiguities thus addressed, a farther objective of the present invention is to enable the fall exploitation of the potential location-determination accuracy achievable through the use of such antenna configurations.

DETAILED DESCRIPTION

Figure 1:
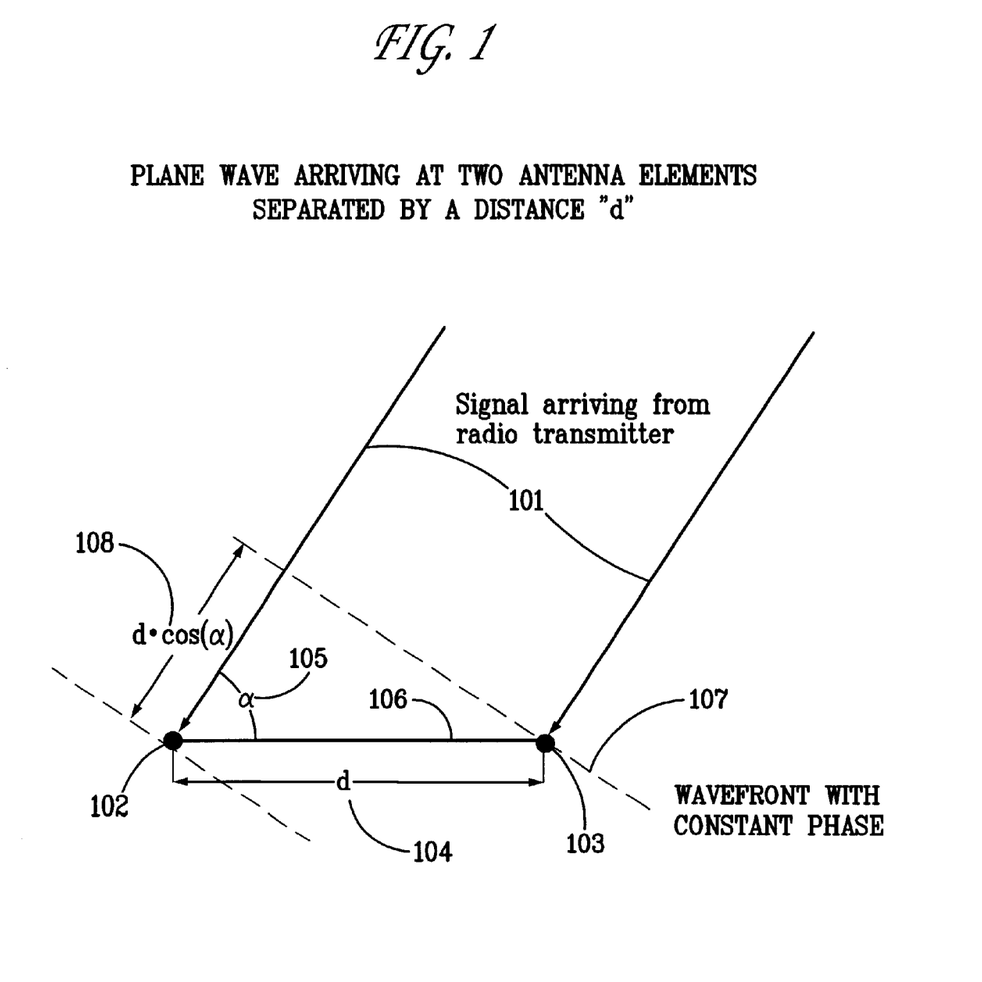
FIG. 1. depicts the geometric relations that exist with the arrival from relative directional angle "α" of a signal plane wave at the positions of two antenna elements that are separated by a fixed distance "d."

The present invention is an extension of the Direction Finding Localization System and the Communications Localization System described in U.S. Pat. Nos. 4,728,959 and 5,959,580. More specifically, the present invention uses differences of phase differences or similarly derived signal characteristic measurements, e.g., of second order products of signal covariances or products, to disambiguate and estimate the signal angle of arrival or other position-sensitive parameters. Prior directional location determination approaches typically encounter difficulties due to the multifold directional ambiguities that are attendant to the use of standard communications antennas in the signal measurement process. Hence, the approaches have typically employed augmentations of the conventional antennas or additions of separate antennas. The present invention enables the straightforward usage of the conventional antenna configurations in extracting the location-related signal characteristics to support accurate location determination. An embodiment of the invention can output the disambiguated angle of arrival or position-related parametric estimate, and can use such an estimate, derived from the appropriate processing of a disambiguating antenna element configuration, to resolve ambiguities from widely spaced antenna elements to achieve a more accurate angle of arrival or other position-related parametric estimate, Line of bearing or directional location determination systems can relate the relative phase of the signal received at two or more antenna elements to the angle of arrival of the signal or directly to a quantification of parameters representing the position or location of the signal transmitter. FIG. 1 shows a plane wave signal 101 arriving at two antenna elements 102 and 103 separated by a distance d 104. The plane wave is arriving from the upper right hand corner of the figure, at an angle a 105 with respect to the line 106 connecting the two antenna elements. The line 107 perpendicular to the plane wave's direction of propagation represents a wavefront of constant phase across the plane wave. In FIG. 1, the wave has to travel a distance d·cos(a) 108 further to the left antenna element than to the right element. In the time it takes the isophase wavefront to travel from the right to the left antenna element, the phase of the elemental signal's carrier frequency at the right element advances by Φ radians.

As represented in FIG. 1, the relationship between the relative phase, Φ, and the signal's angle of arrival, α, is:

$$\Phi = (2\pi/\lambda) d \cdot \cos(\alpha) \qquad \text{(equation 1)}$$

where

λ=c/f; wavelength of signal
  f=frequency of signal
  c=speed of light
  d=distance between the antenna elements
  α=signal's angle of arrival With most real world systems, this relationship is complicated by the interaction of the antenna elements with each other and by nearby reflectors, including a backplane or other wave-focussing structures, and multipath propagation. Accurate phase to angle of arrival conversion can be accomplished by tabulating measurements of the relative phase for different angles or modeling the interaction and modifying the above equation. Depending on the desired system accuracy, the above equation may be accurate enough.

When the distance or separation between the two receiving antenna elements is less than half a wavelength, i.e., $d<\lambda/2$, then signals arriving from direction a can generate a unique relative phase response Φ. However, the inter-element phase relations are ambiguous to additive multiples of one "cycle," i.e., $2\pi c$ radians (or 360 degrees). Thus, when the distance between elements is larger than half of the signal's wavelength, multiple angles can generate the same relative phase response. For example, if $d=\lambda$, then the above relation becomes:

Φ=2π cos(α).

Figure 2:
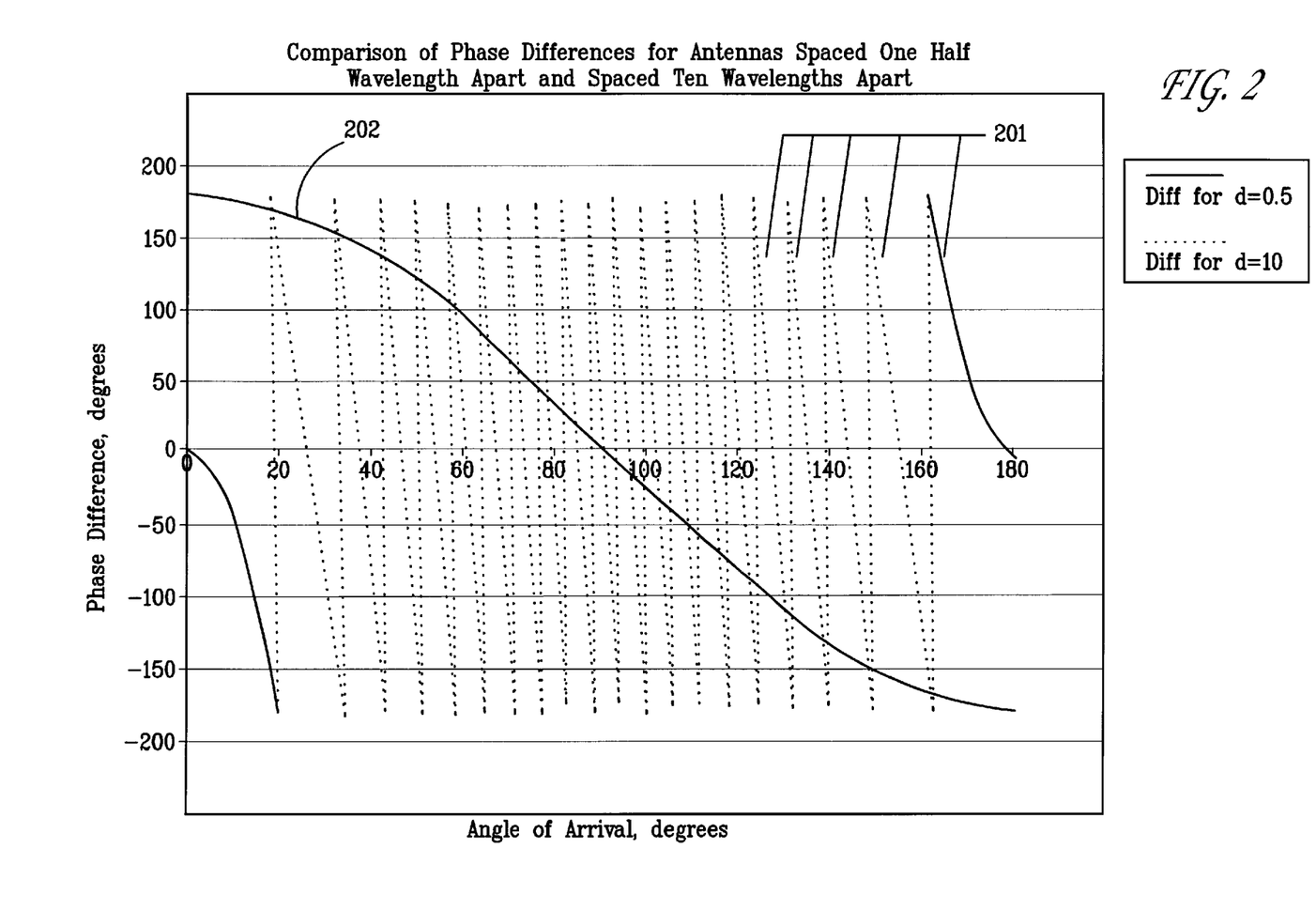
FIG. 2. shows a graphical comparison of phase difference relations for signals from antenna elements spaced one half wavelength apart and spaced ten wavelengths apart.

In this case, the relative phase differences for signals arriving at 0 and 180 degrees (0 and π radians) cannot be differentiated from that for those arriving at 90 degrees (π/2 radians). In all three cases, with due account for the ambiguous additive multiples of one cycle (2π radians), the ambiguous relative phase difference is zero degrees or radians. The larger the separation between the two antennas, the more ambiguous the angle of arrival is for any given measured phase difference. FIG. 2 illustrates how ambiguous the phase difference measurement can be when the antenna elements are separated by ten wavelengths, represented by the dotted line 201, compared to when the antenna elements are separated by half a wavelength, represented by the continuous line 202. FIG. 2 also illustrates that, when the ambiguity can be resolved or disambiguated, phase measurement errors associated with the elements separated by ten wavelengths map to smaller angle of arrival errors than identical phase measurement errors associated with the half wavelength separated antenna elements.

Cellular telephone networks use a network of fixed base stations, each station servicing a geographic cell. Some cells are serviced by a single monopole antenna. In this case, the antenna is connected to a transmitter and a receiver. However, often cells are subdivided into sectors. Each sector may be serviced by three directional antenna elements located at the base station. Typically the antenna elements for each sector are aligned in a straight line, orientated approximately in the same, common, sector-centered direction, and separated from each other by multiple wavelengths. The outer most antenna elements are often used to receive signals from cellular phones, and the middle antenna element is used to transmit signals to the cellular phones and is typically positioned in the central region between the two, end, receiving elements. In typical urban and suburban environments, the separation of the two receiving elements is ten to twelve wavelengths, to support enhanced performance through diversity reception.

Since the typical, "conventional," cellular-antenna elements are separated by a large multiple of wavelengths, line of bearing or position determination systems based on equation 1 cannot use the existing sectored antennas unless the system can resolve or disambiguate the ambiguities arising from multiple wavelength spacing.

The ambiguity can be resolved by installing an additional pair of antenna elements separated by one half wavelength. In this case, the two added elements are independent of the existing cellular antenna elements. If the resulting accuracy is good enough for the system requirements, then no further processing or adjustment is required. If higher angular accuracy is desired, then the estimate and bearing error based on the additional antenna element pair provide bounds for mapping the relative phase measurement from the widely spaced cellular antenna elements to the disambiguated, more accurate angle of arrival.

A second method for resolving the ambiguity involves installing an added antenna element a half wavelength away from either end antenna element. In this case, the antenna elements separated by a half wavelength can be processed using the same technique as described above for processing an additional pair of antenna elements separated by a half wavelength.

A third method involves moving the middle antenna element to a position within a half wavelength from either end and reconfiguring the middle antenna element so that it connects to both a transmitter and a receiver, as is done with some monopole antennas.

The three methods described above use at least one pair of antenna elements separated by approximately a half wavelength. A bearing estimate based on half wavelength separated antenna elements can be made using an apparatus based on U.S. Pat. No. 4,728,959, entitled "Direction Finding Localization System," and U.S. Pat. No. 5,959,580, entitled "Communications Localization System," both of which are incorporated herein by reference.

Figure 3:
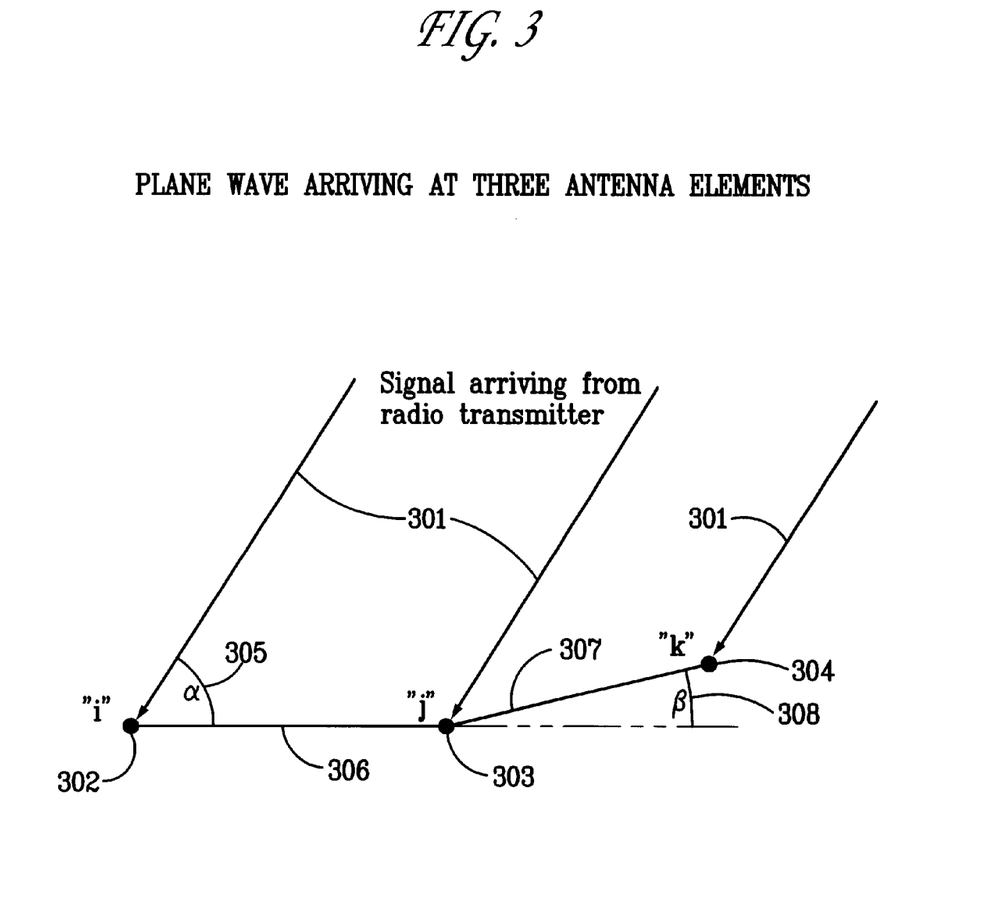
FIG. 3. depicts the geometric relations that exist with the arrival of a signal plane wave at the positions of three antenna elements.

An alternative approach, described below, enables the derivation of disambiguated signal characteristics without the necessary use of antenna configurations that have elements spaced by approximately a half wavelength. The basics of this approach can be seen in a detailed examination of the phase and element separation relations. The geometric relations of this approach are depicted in FIG. 3. The radio signal 301 arrives at antenna elements "i" 302, "j" 303, and "k" 304 from the direction a 305 relative to the baseline 306 between elements "i" and "j." The phase difference between the elemental signals received through antenna elements "i" and "j" can be approximated by equation 2; the exact relationship depends on the degree of interaction between each antenna element and neighboring reflectors:

$$\Phi_{ij}=(2\pi/\lambda)d_{ij}\cdot\cos(\alpha) \quad \text{(equation 2)}$$

where $\Phi_{ij}$=phase difference between antenna elements i and j
  λ=signal wavelength
  $d_{ij}$=distance between the antenna elements i and j
  α=signal's angle of arrival Similarly, the phase difference between antenna elements "j" and "k" is given by $$\Phi_{jk}=(2\pi/\lambda)d_{jk}\cdot\cos(\alpha)$$

When the antenna elements are sufficiently aligned in a straight line, such as may be the three antenna elements servicing the same sector on a sectored antenna tower, the difference of the phase differences, $\Delta_{ijk}$, may be represented and related to the signal source location by equations 3a, 3b, and 3c.

$$\Delta_{ijk}=\Phi_{ij}-\Phi_{jk} \quad \text{(equation 3a)}$$

$$\Delta_{ijk}=(2\pi/\lambda)d_{ij}\cdot\cos(\alpha)-(2\pi/\lambda)d_{jk}\cdot\cos(\alpha) \quad \text{(equation 3b)}$$

$$\Delta_{ijk}=(2\pi/\lambda)\cdot(d_{ij}-d_{jk})\cdot\cos(\alpha) \quad \text{(equation 3c)}$$

For clarity, as shown in FIG. 3, element "j" is assumed to be between "i" and "k." If the elements are not colinear, but rather the baseline 307 between elements "j" and "k" is offset by the angle β 308 relative to the baseline between elements "i" and "j" then the difference of phase differences relation can be expressed as $$\Delta_{ijk}=(2\pi/\lambda)\cdot[(d_{ij}-d_{jk}\cdot\cos(\beta))\cdot\cos(\alpha)-d_{jk}\cdot\sin(\beta)\cdot\sin(\alpha)] \quad \text{(equation 3d)}$$

This minimal added complexity, in equation 3d, is trivially accommodated with appropriate adaptations of the calculations that are applied with the expression of equation 3c, and generally is not explicitly addressed in most of the elucidating descriptions herein.

When the difference $|d_{ij}-d_{jk}|$ in the antenna element separations is less than half a wavelength, then all differences of phase difference measurements can map unambiguously to associated angles of arrival. When the difference in the antenna element separations is between a half wavelength and a fall wavelength, then some differences of phase difference measurements will map unambiguously to angles of arrival, and other differences of phase difference measurements will each map to two possible angles of arrival. In this case, the theoretical break point, bp, between ambiguous and unambiguous differences of phase difference measurements is:

$$bp=360\cdot(1-|dij-djk|/\lambda) \text{ degrees} \quad \text{(equation 4)}$$

When the magnitude of a difference of phase difference measurements, $\Delta_{ijk}$, is less than the break point, bp, the difference can be related to a unique angle of arrival.

Figure 4:
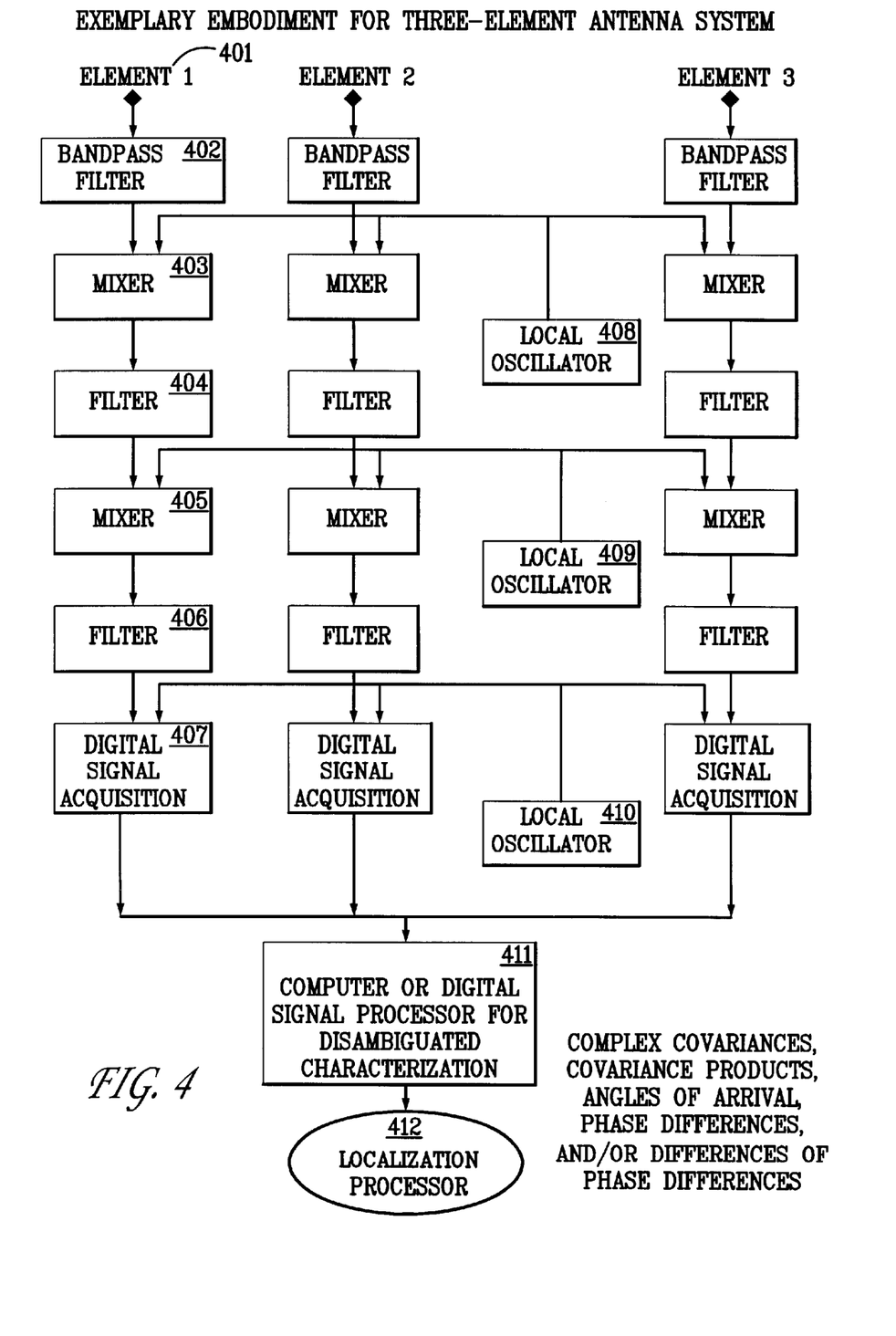
FIG. 4. shows signal and data processing functional flow for an exemplary embodiment of a three-element antenna system.

FIG. 4 shows a system for determining the relative direction of a wireless transmitter using three antenna elements. The system consists of antenna elements, filters, mixers, digital signal acquisition units, and a computer or digital signal processor. The data flow through the system can be illustrated by reviewing how data from 401 antenna element 1 are processed. The system can be expanded to use additional antenna elements by adding additional filters, mixers, and digital acquisition components. For example, the processing for such additional elements could be implemented with the analysis of the elemental signals in triplets, as with the relations specifically described herein.

The elemental radio signal received at 401 antenna element 1 is supplied to bandpass filter 402 to filter out or sufficiently attenuate signals that are not of interest. When the antenna element serves as a transmitter as well as a receiver, the bandpass filter filters out unwanted transmitted signals and passes received signals of interest. The signal line from local oscillator 408 supplies mixer 403, which bandshifts the radio signal to an intermediate frequency. The same signal from local oscillator 408 bandshifts the radio signals from each antenna element thus maintaining the phase relationship of the signals received at all the antenna elements. Additional filters 404 and mixers 405 may be added provided the mixers use a common local oscillator 409 to maintain the phase relationship of the signals received at all the antenna elements.

After the signal has passed the final mixer, filter 406 filters the signal in preparation for digital signal acquisition 407. Each digital signal acquisition unit converts an analog signal to a digitized signal and stores the resultant data samples in a computer 411, digital signal processor, or device capable of performing arithmetic and logical operations on the digitized data. Maintaining the phase relationship of the received signals, the digital signal acquisition units are synchronized using a common local oscillator 410.

Within computer 411, the data stream from each antenna element may be further filtered. If the processed signal is from an analog cellular phone, the phase of the signal at each instant in time can be determined by converting the signal to its frequency-shifted, equivalent, "analytic" form (hereinafter, the analytic signal) and then taking the arctangent of the real and imaginary (i.e., "quadrature") components of the signal. A description of analytic signals can be found in "Theory and Application of Digital Signal Processing," page 72, by Lawrence Rabiner and Benard Gold (Prentice-Hall, Englewood Cliffs, N.J., 1975), or in "Discrete-Time Signal Processing," page 683, by Alan V. Oppenheim and Ronald W. Schafer (Prentice-Hall, Englewood Cliffs, N.J., 1989), both of which texts are incorporated herein by reference. If the phone supports a digital technology, such as time division multiple access (TDMA) or code division multiple access (CDMA), and broadcasts in a digital mode, then the computer can also extract the phone generated digital signal data from the data stream before or after converting the signal to its analytic form.

Computer 411 calculates the inter-element complex signal products, covariances, covariance products, phase differences, difference of phase differences, angles of arrival, and/or error estimates. This information is transferred to a localization process in a processor 412 that can combine information from two or more systems or information from one system together with collateral, location-sensitive data to determine the transmitter's location. Example systems for combining such measured signal characteristic information with other relevant position-indicative information are described in U.S. Pat. No. 4,728,959, entitled "Direction Finding Localization System," and U.S. Pat. No. 5,959,580, entitled "Communications Localization System," both of which patents are incorporated herein by reference.

Figure 5:
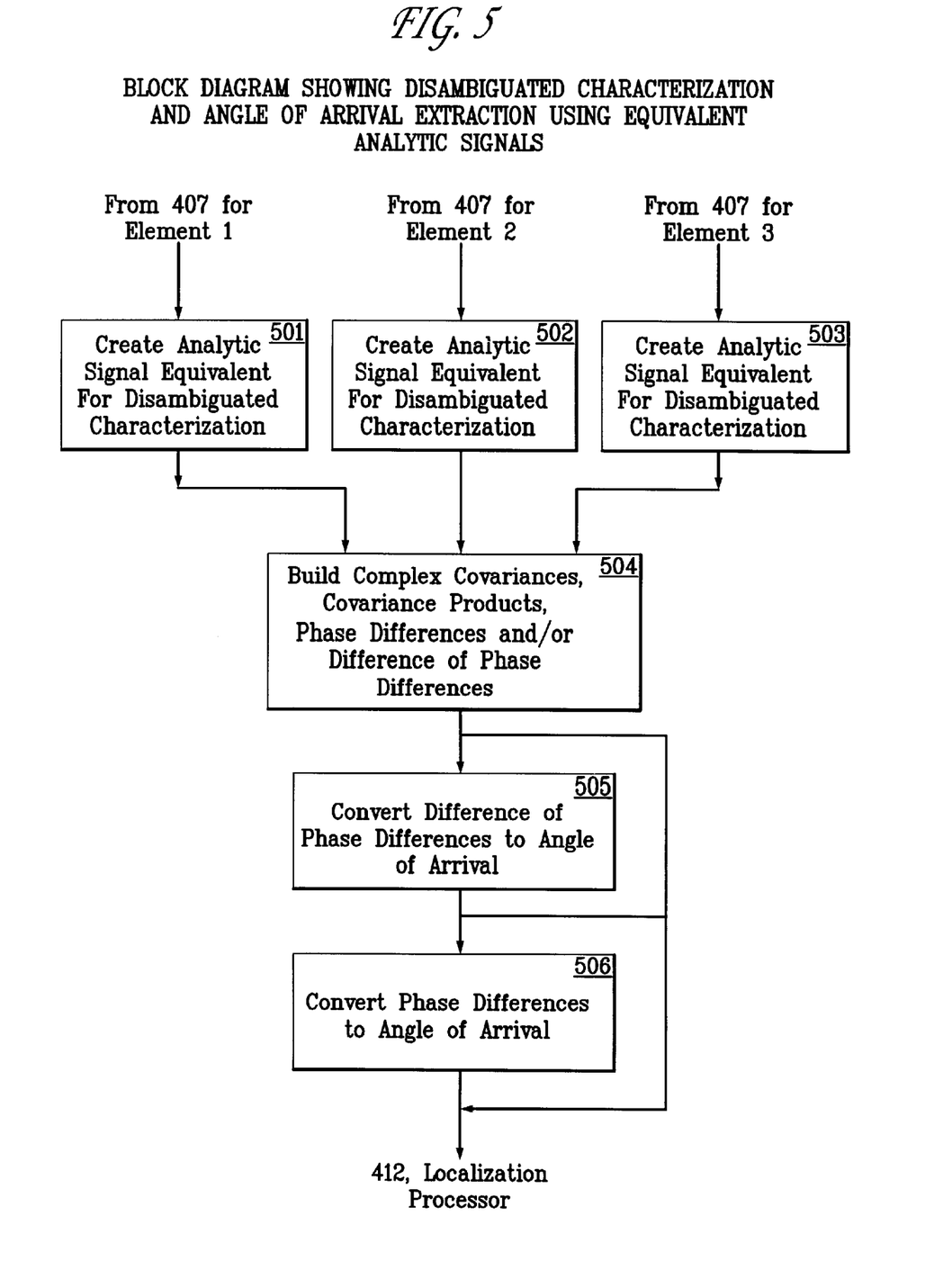
FIG. 5. is a block diagram showing the process flow for the disambiguated characterization and angle-of-arrival extraction using equivalent analytic signals.

FIG. 5 shows a block diagram depicting how the angle of arrival can be extracted from the analytic signal. The processes of blocks 501, 502, and 503 convert to equivalent analytic form the digitized signal from the digital signal acquisition component 407, shown in FIG. 4. The process of block 504 produces inter-element signal products, covariances, and/or products of products or covariances, as needed. From these signal-related products, the process of block 504 extracts or derives signal characteristic measurements, such as the phase differences and difference of phase differences from the analytic signals. There are several techniques for calculating the difference of the phase differences, as shown in the following examples.

The first technique is to calculate the derived phase difference from the instantaneous phase of the analytic signals. For example, the instantaneous phases, $\Phi_i(t)$ and $\Phi_j(t)$, can be obtained at each moment in time "t" for the signals received with antenna elements "i" and "j." Each analytic signal sample $z_i(t)$ at time "t" can be represented by a complex number, having real and imaginary components or having magnitude and phase components. The instantaneous phase of the analytic signal can be calculated using:

$$\Phi_i(t)=\text{atan2}(\text{IM}(z_i(t)), \text{RE}(z_i(t))) \quad \text{(equation 5)}$$

where atan2( ) calculates the dual-component arctangent valid over the range −π to +π (or 0 to 2π) radians (2π radians=360 degrees) IM( ) extracts the imaginary component of the analytic signal RE( ) extracts the real component of the analytic signal Then the instantaneous phase difference $\Phi_{ij}(t)$ between antenna elements "i" and "j" can be determined by the subtraction:

$$\Phi_{ij}(t)=\Phi_i(t)-\Phi_j(t) \qquad \text{(equation 6)}$$

The phase differences can be temporally averaged or integrated to create a more accurate or stable estimate. Such an averaged, integrated, filtered or smoothed estimate can be obtained with the application of appropriate models or weighting for the contributions to the "average." For example, the desired parametric estimate may be the simple, constant-or equi-weighted average, provided the averaging period or interval is short enough that the transmitting phone does not appreciably move with respect to the antennas during the interval. For more extended integrations or filtering, including Kalman filtering, appropriate parameterizations may account for relational signal changes that can be anticipated due to transmitter motion over the duration of the integration interval. For example, such filtering could even include multiple motion models representing different transmitter speeds or other forms of rates of change, with the ultimate results attained through joint probabilistic combination approaches.

The process of evaluation for $\Phi_{ij}(t)$ should bound it between −180 and +180 degrees. In this bounding process, called "phase unwrapping," if the preliminary value of $\Phi_{ij}(t)$ is greater than 180 degrees, then 360 degrees are subtracted from $\Phi_{ij}(t)$, and if the preliminary value of $\Phi_{ij}(t)$ is less than −180 degrees, then 360 degrees are added to $\Phi_{ij}(t)$. Similarly the phase difference $\Phi_{jk}(t)$ between antenna elements "j" and "k" can be determined by:

$$\Phi_{jk}(t)=\Phi_j(t)-\Phi_k(t) \qquad \text{(equation 6a)}$$

The difference of the phase differences then can be produced by the subtraction:

$$\Delta_{ijk}=\Phi_{ij}(t)-\Phi_{jk}(t) \qquad \text{(equation 3a)}$$

This difference should also be limited to the range between −180 and +180 degrees. As with the individual differences above, the difference of phase differences can be averaged to create a more accurate estimate.

A second technique, that avoids the (−180, +180 degree) boundary problem, is to compute the difference of phase differences using the analytic signals $z_i(t)$, $z_j(t)$, $Z_k(t)$ associated with antennas "i", "j", and "k". The instantaneous phase difference $\Phi_{ij}(t)$ between the analytic signals obtained with antenna elements "i" and "j" can be determined from the "conjugate product" of the analytic signal samples, i.e., the product of signal $z_i(t)$ with the complex conjugate of signal $z_j(t)$:

$$\Phi_{ij}(t)=\text{atan2}(\text{IM}(z_i(t)\cdot z^*_j(t)), \text{RE}(z_i(t)\cdot z^*_j(t))) \qquad \text{(equation 7)}$$

where $z^*_j(t)$ is the complex conjugate of $z_j(t)$. The complex conjugate $z^*$ of a complex number z has the magnitude of the complex number z, but the phase is the negative of that of the complex number z. As with the phase differences above, the stability of the conjugate products can be enhanced through temporal averaging or integration to form the complex "covariance" of the signals, e.g., of $z_i(t)$ and $z_j(t)$. Under stable conditions, this "averaged" covariance represents an estimate of the "expectation value" of the conjugate product. As described, this covariance and the instantaneous conjugate products, from which it derives, are equivalently related to the averaged or instantaneous phase differences through the arctangent relation. Then, as in the previous technique, any difference formed from the subtraction of phase differences derived from the conjugate products and any summation involved in the integration of phase differences should be phase unwrapped.

The difference of the phase differences, $\Delta_{ijk}(t)$, for antennas i, j, and k can be alternatively obtained from:

$$\Delta_{ijk}(t)=\text{atan2}(\text{IM}(z_i(t)\cdot z^*_j(t)\cdot z^*_j(t)\cdot z_k(t)), \text{RE}(z_i(t)\cdot z^*_j(t)\cdot z^*_j(t)\cdot z_k(t))) \qquad \text{(equation 8)}$$

In this relation, the higher-order (i.e., the fourth-order) product of the elemental signal components is inherently and equivalently imbued with the position-dependent characteristics represented in the difference of the phase differences discussed previously. As in the previous technique, the difference of phase differences extracted in this fashion can be temporally averaged or integrated to create a more accurate estimate, with due attention to phase unwrapping. Alternatively, again avoiding the need for and complexities of intermediate phase unwrapping, the tri-signal, higher-order, complex products of the paired-signal conjugate products can be temporally averaged together before the arctangent is calculated.

A third technique uses the Fourier Transform of the signal data from each antenna element to derive the equivalent narrow-band analytic signal "frequency" components, and calculates the phase of each frequency component of the signal (reference Rabiner & Gold, Chapter 6, or Oppenheimer & Schafer, Chapter 8). In this technique, the narrow-band complex spectra components $Z_i(\omega)$ for angular frequency $\omega$ (=2πf) over the desired spectral domain can be manipulated in the manners analogous to the processes involving the full-band analytic signal $z_i(t)$ for time sample t, described in the above discussions.

Block 505 shows that after the difference of the phase differences has been calculated, the computer can convert the difference of the phase differences to an angle of arrival. The angle of arrival calculation can be done several different ways. The following three techniques exemplify the conversion.

The first technique ignores the presumably negligible interactions of the antenna elements and uses the approximate relation of equation 3c:

$$\Delta_{ijk}=(d_{ij}-d_{jk})\cdot(2\pi/\lambda)\cdot\cos(\alpha) \qquad \text{(equation 3c)}$$

The inverse function for equation 3c, yielding the angle of arrival, is:

$$\alpha=\text{acos}(\Delta_{ijk}\cdot\lambda/(2\pi\cdot(d_{ij}-d_{jk}))) \qquad \text{(equation 9a)}$$

Of course, the equivalent inverse for the non-colinear form in equation 3d can be implemented with iterative accommodation for the transcendental functions. For example, the inverse can be iteratively evaluated by beginning with an initial value of zero for the cosine, $\cos(\alpha^{(0)})=0$, and then iterating to convergence before inverting:

$$\cos(\alpha^{(n+1)}) = \frac{\Delta_{ijk}\cdot\lambda/2\pi + d_{jk}\cdot\sin(\beta)\cdot\sqrt{1-(\cos(\alpha^{(n)}))^2}}{d_{ij}-d_{jk}\cdot\cos(\beta)} \qquad \text{(equation 9b)}$$

Alternatively, in standard form, the general inversion for equation 3d is expressed as $$\alpha=\text{acos}(\Delta_{ijk}\cdot\lambda/(2\pi\cdot d_{ijk}))-\gamma_{ijk} \qquad \text{(equation 9c.1)}$$

where $$d_{ijk} = \sqrt{(d_{ij} - d_{jk} \cdot \cos(\beta))^2 + (d_{jk} \cdot \sin(\beta))^2} \quad \text{(equation 9c.2)}$$

$$\gamma_{ijk} = a\tan 2(d_{jk} \cdot \sin(\beta), d_{ij} - d_{jk} \cdot \cos(\beta)) \quad \text{(equation 9c.3)}$$

A second technique establishes a database of measurements or calibrations of the characteristic differences of the phase differences or associated complex product-based equivalents for a transmitter at known angles or other position-related parametric values with respect to the antennas. The data are compiled into a table of experimentally or empirically derived measurements with minimized ambiguities versus signal angles of arrival or transmitter positions. When signals from a transmitter at an unknown location are received and processed, the derived difference of phase differences or other complex-product based equivalent is compared against the tabulated database. The two table entries closest to the measured value bound the angle of arrival or position relation; a refined angle of arrival or parameterized position estimate is made by interpolating between the two table entries.

A third technique, based upon a modification of equation 3c, uses the inverse of this modified equation to convert measurements to appropriate associated angles of arrival. The modified equation could be based on either modeling the interaction between the antenna elements and their neighborhood, or doing a parametric or polynomial fit to a table built using the second technique.

Block 506 is an optional block for generating a second angle of arrival estimate using just the measurements of the phase differences or equivalent signal products. The rationale for using such measurements can be seen in the functional inverses of equations 1 and 3c.

$$\alpha = a\cos((\Phi_{ij}(t) - \Phi_{jk}(t)) \cdot \lambda / (2\pi \cdot (d_{ij} - d_{jk}))) \quad \text{(equation 10a)}$$

$$\alpha = a\cos((\Phi_{ij}(t) \cdot \lambda / (2\pi \cdot d_{ij})) \quad \text{(equation 10b)}$$

The position-determination accuracy benefits in the use of disambiguated measurements obtained with antenna configurations with conventional element spacings or separations can be seen in the associated angle-of-arrival relations. The angle of arrival error associated with the angle of arrival determined from the difference of the phase differences depends upon the difference of the separation between antenna elements "i" and "j" and the separation between antenna elements "j" and "k". Since the separations between the antenna elements of either pair may be significantly larger than the difference of the separations, the angle of arrival errors associated with the angles of arrival determined from the phase differences of related signal products may be significantly less than the angle of arrival errors associated with the differences of phase differences or related higher-order signal products. Thus, as described herein, with the usages of such "higher order" measurements or other disambiguating measurements in the disambiguation of "standard" measurements, the enhanced accuracies of the extracted signal characterizations can be exploited in the derivations or position-dependent parameters with correspondingly enhanced accuracy.

The conversion of phase difference or signal product to angle of arrival or other position-related parametric description can be accomplished by techniques analogous to the techniques used for converting a difference of phase differences to an angle of arrival. The preferred technique is to measure or derive the signal characteristics, such as the phase differences, for a transmitter at known angles or positions with respect to the antennas. The measurements are compiled into a table or database of measured signal characteristics, such as phase differences, versus angles of arrival or other position-descriptive parameters.

Subsequently, elemental phase relations may be measured for signals from a transmitter at an unknown location, and these measurements may be evaluated in association with the previously established table or database for determination of the appropriate positional parameters. For example, the signals can be received with an antenna configured with three or more elements, and then the tabulated phase relations can be evaluated to extract for each measured phase difference the two tabulated phase differences closest to the measured phase difference. The tabulated values that are selected are those having the appropriate difference or characteristic closer to the measured difference of phase differences or other measured characteristic having reduced ambiguity. The angle of arrival can then be determined by interpolating between these two measurements.

Illustration of this procedure is attained with reference to FIG. 2.

Assume the dotted line representing the phase difference when the antenna separation is ten wavelengths is converted to a table. Assume the table was built by making a measurement with the test transmitter moved in front of the antenna elements from an angle of arrival of 0 degrees, to an angle of arrival of 180 degrees in 1 degree increments. When signals from a transmitter at an unknown location are received, an initial angle of arrival estimate can be made based on the difference of phase differences. As an example interpolation algorithm or procedure, if the angle of arrival estimate for the initial unambiguous differential phase is 118 degrees and the paired-element phase difference-measurement is −7.2 degrees for the ambiguous phase relation of the elements with large spatial separation, then the table search would begin at 118 degrees for an angle of arrival. At 118, the phase difference for the example is 108. The search algorithm checks higher angle of arrival entries until reaching a phase difference less than −7.2 degrees. This table entry (angle =121, phase difference =−54) and the preceding table entry (angle =120, phase difference =0) are saved as a candidate match. The algorithm then searches for lower angles of arrival until first finding where the phase difference changes from being positive to being negative, and then finding the next phase difference that is greater than −7.2 degrees. This table entry (angle =113, phase difference =33.3) and the previous entry (angle =114, phase difference=−24.) are saved as a candidate match. The two candidate matches are compared and whichever is closer to the initial estimate is retained. Finally, the angle of arrival is computed by interpolating between the two retained table entries. In this case, using a linear interpolator, the angle of arrival (AOA) would be estimated at $$\text{AOA} = [(-7.2 - 0)/(-54 - 0)] \cdot (121 - 120) + 120 = 120.133 \text{ degrees}$$

After the disambiguated angles of arrival or related signal characteristic measurements have been estimated, the measurement data are passed to the localization system 412, which combines the data with measurements from multiple systems or with collateral position-dependent information to determine the transmitter's location. The processes and methods for evaluation of the estimated location representation from the signal-related measurements and any associated information are not the subject of the present invention. Such techniques may include least-squares evaluations, probability-based likelihood function analyses, rule-based heuristic procedures, and other appropriate standard processing technologies known to those skilled in the arts.

The principles, preferred embodiments and modes of operation of the present invention have been set forth in the foregoing specification, from which it should now be readily apparent that a person of ordinary skill in the art may implement appropriate data processing routines. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously envisioned. Numerous variations and changes can be made to the foregoing illustrative embodiments without departing from the scope and spirit of the present invention as set forth in the appended claims.

What is claimed is:

1. A method for measuring position-dependent characteristics of mobile radio signals from a mobile transmitter, the method comprising the steps of
receiving the transmitted signals at an antenna configuration having multiple phase-synchronized receiving elements;
performing disambiguation processing for the extraction of position dependent characteristics of the signals; and
evaluating the characteristic parameters indicative of the transmitter's position.

2. The method of claim 1, wherein said antenna configuration has three or more elements.

3. The method of claim 2, wherein said antenna elements comprise at least one pair of elements whose inter-element separation is a large quantity of half wavelengths of the signals.

4. The method of claim 2, wherein said antenna elements comprise at least two pairs of elements whose inter-element separations differ by a small quantity of half wavelengths of the signals.

5. The method of claim 1, wherein said disambiguation processing includes the extraction of signal characteristics having reduced ambiguity for resolving the selection of the accurate positional interpretation of extracted ambiguous characteristics.

6. The method of claim 1, wherein said disambiguation processing includes formation of differences of inter-element signal phase differences.

7. The method of claim 1, wherein said disambiguation processing includes formation of higher-order signal products.

8. The method of claim 1, wherein said evaluated characteristic parameters indicative of the transmitter's position include angle of arrival.

9. The method of claim 1, wherein said evaluated characteristic parameters directly quantify the transmitter's position.

10. An apparatus for measuring position-dependent characteristics of mobile radio communications signals from a mobile transmitter, comprising:
an antenna configuration having multiple elements for receiving the transmitted signals;
phase-synchronized elemental signal receivers for extracting the signals to be processed;
a signal processing unit that performs disambiguation processing for the extraction of position-dependent characteristics of the signals; and
a processing unit that evaluates the characteristic parameters indicative of the transmitter's position.

11. An apparatus as in claim 10, wherein said antenna configuration has three or more elements.

12. An apparatus as in claim 11, wherein said antenna elements comprise at least one pair of elements whose inter-element separation is a large quantity of half wavelengths of the signals.

13. An apparatus as in claim 11, wherein said antenna elements comprise at least two pairs of elements whose inter-element separations differ by a small quantity of half wavelengths of the signals.

14. An apparatus as in claim 10, wherein said disambiguation processing includes the extraction of signal characteristics having reduced ambiguity for resolving the selection of the accurate positional interpretation of extracted ambiguous characteristics.

15. An apparatus as in claim 10, wherein said disambiguation processing includes formation of differences of inter-element signal phase differences.

16. An apparatus as in claim 10, wherein said disambiguation processing includes formation of higher-order signal products.

17. An apparatus as in claim 10, wherein said evaluated characteristic parameters indicative of the transmitter's position include angle of arrival.

18. An apparatus as in claim 10, wherein said evaluated characteristic parameters directly quantify the transmitter's position.

19. A method for measuring the angle of arrival (AOA) of a radio signal from a mobile transmitter, the method comprising:
detecting the radio signal at an antenna configuration having multiple antenna elements separated from each other by a known distance, wherein the distance between elements is larger than one-half of the received signal's wavelength, whereby multiple angles of arrival can generate the same relative phase response;
determining an unambiguous phase difference representing the difference in phase of the signal as detected at the respective antenna elements; and
using the unambiguous phase difference to determine the angle of arrival of the received signal.

20. The method of claim 19, wherein the unambiguous phase difference is determined by disambiguation processing.

21. The method of claim 20, wherein said disambiguation processing includes correcting or reducing phase ambiguity in the received signal.

22. The method of claim 21, wherein said disambiguation processing includes formation of differences of inter-element signal phase differences.

23. The method of claim 21, wherein said disambiguation processing includes formation of higher-order signal products.

24. The method of claim 19, wherein the multiple receiving elements are phase-synchronized.

25. The method of claim 19, wherein said antenna elements comprise at least one pair of elements whose inter-element separation is a large quantity of half wavelengths of the received signal.

26. The method of claim 19, wherein said antenna elements comprise at least two pairs of elements whose inter-element separations differ by a small quantity of half wavelengths of the received signal.

27. The method of claim 19, wherein said antenna configuration has three or more elements.

* * * * *

UNITED STATES PATENT AND TRADEMARK OFFICE
CERTIFICATE OF CORRECTION

PATENT NO. : 6,366,241 B2
DATED : April 2, 2002
INVENTOR(S) : Kenneth D. Pack et al.

It is certified that error appears in the above-identified patent and that said Letters Patent is hereby corrected as shown below:

Title page,
Item [56], References Cited, add the following:
-- 5,844,522    12/1998        Sheffer et al.    342/457 --

Column 1,
Line 64, delete "farther" and insert -- further -- therefor;

Column 2,
Line 45, delete "," after "estimate" and insert -- . -- therefor;
Line 54, delete "a" and insert -- α -- therefor;

Column 3,
Line 19, delete the first occurrence of "a" and insert -- α -- therefor;

Column 10,
Line 49, delete "-24.)" and insert -- -24) -- therefor.

Signed and Sealed this

Tenth Day of December, 2002

JAMES E. ROGAN
*Director of the United States Patent and Trademark Office*